C. HAUFF.
Neck-Yoke.
No. 212,689. Patented Feb. 25, 1879.
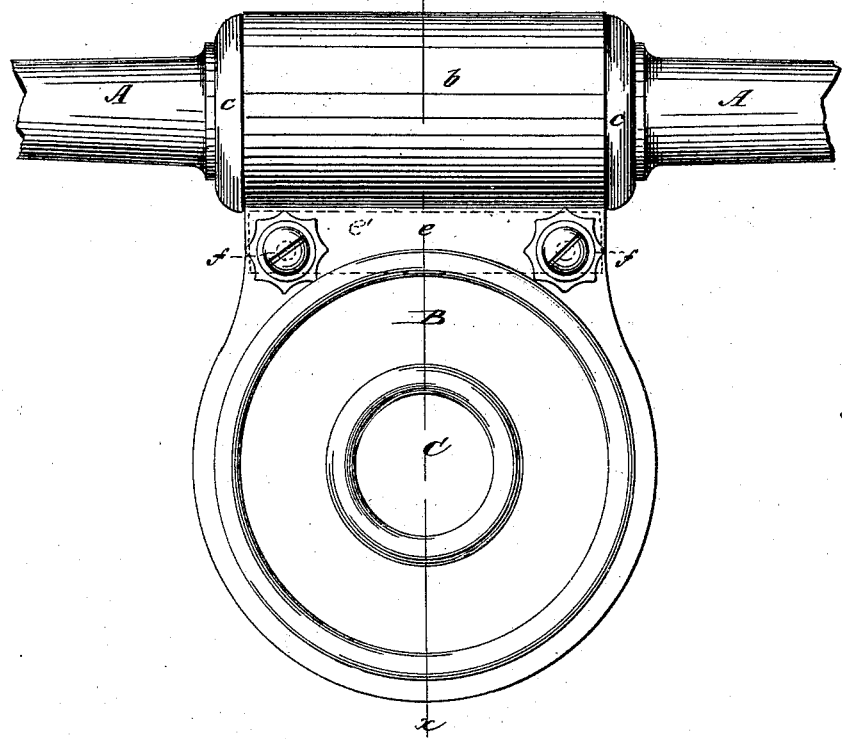
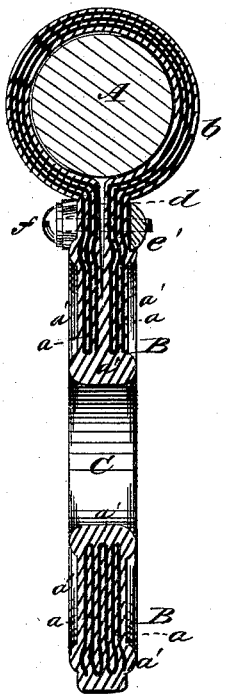

UNITED STATES PATENT OFFICE.

CHARLES HAUFF, OF ASHLAND, OHIO.

IMPROVEMENT IN NECK-YOKES.

Specification forming part of Letters Patent No. 212,689, dated February 25, 1879; application filed August 29, 1878.

*To all whom it may concern:*

Be it known that I, CHARLES HAUFF, of Ashland, in the county of Ashland and State of Ohio, have invented a new and Improved Neck-Yoke, of which the following is a specification:

The object of my invention is to produce a neck-yoke in which the tongue-support and connection with the breast-strap bar will possess greater strength, capacity to withstand wear and tear, and neatness of finish than those made of leather and now generally in use.

It consists in making the parts usually called the "leathers" of rubber and linen cloth or duck, in one continuous piece, and in such a manner that there will be a core of duck or linen cloth deeply embedded in and covered by rubber, in the manner hereinafter described.

In the accompanying drawings, forming part of this specification, Figure 1 is a front view of my improvement; and Fig. 2 is a vertical section of the same, showing the method of construction.

Similar letters of reference indicate corresponding parts in all the figures.

Referring to the drawings, A represents the bar to which the breast-straps are attached. B represents the tongue-support and connection with the bar, usually called the "leathers," as it is generally made of that material; but in my invention it is made of rubber combined with linen cloth or duck in the following manner: A rough form is made with linen, folded as shown by the lines $a$ $a$, &c., in Fig. 2. This form is placed in a mold of the proper size and shape, and sheet-rubber laid or placed around it, when pressure is exerted upon it to give it the proper density, in the usual manner of molding articles in rubber, and it is also vulcanized in the usual manner. Thus constructed, the part B is composed of an unbroken rubber exterior, $a'$ $a'$, and an inner core, $a$, of cloth, which gives it great strength, and deprives it of undue elasticity.

The sleeve or thimble portion $b$ is designed to fit over the wooden bar A, between the collars $c$ $c$. As, however, it is smaller in internal diameter than the collars, and it is deprived of its elasticity by the cloth core, a slit, $d$, is made, extending from its inner surface down in the neck $e$. This allows it to be expanded sufficiently to pass it over the collars $c$ $c$ on the bar A.

When placed in position, as shown in Fig. 1, bolts or rivets $ff$ are passed transversely through the neck, and firmly screwed into a metal plate, $e'$, or in any other suitable manner, whereby the slit $d$ is closed up, and the sleeve $b$ effectually prevented from expanding and slipping over the collars $c$ $c$.

The hole C is for the purpose of receiving the end of the tongue or pole.

By this construction it is obvious that greater strength and neatness of finish are obtained than by using leather, as is now generally done. As the outer surface is smooth and free from seams or any unevenness, no part is specially subject to friction, and the inconvenience and trouble caused by ripping are avoided. So, too, as the rubber is rendered quite inelastic by the cloth core, there is no possibility of the sleeve or thimble slipping from the bar or the pole running through the hole, and thus a source of great trouble and danger is avoided.

Having thus described my invention, I claim as new and desire to secure by Letters Patent—

As an improvement in the construction of neck-yokes, the part B, for connecting the breast-strap bar A with the tongue or pole, made of rubber and cloth, in the manner described, and in combination therewith the bolts or rivets $ff$, passed transversely through the neck $e$, to close the slit $d$, substantially as and for the purpose hereinbefore described.

CHARLES HAUFF.

Witnesses:
ALONZO H. WILLIAMS,
JOSEPH ABBE.